US011716038B2

(12) United States Patent
Ohori et al.

(10) Patent No.: US 11,716,038 B2
(45) Date of Patent: Aug. 1, 2023

(54) MOTOR CONTROL DEVICE, MOTOR UNIT, AND MOTOR CONTROL METHOD

(71) Applicant: MITSUBA Corporation, Gunma (JP)

(72) Inventors: Ryo Ohori, Gunma (JP); Takashi Tai, Gunma (JP)

(73) Assignee: MITSUBA Corporation, Gunma (JP)

( * ) Notice: Subject to any disclaimer, the term of this patent is extended or adjusted under 35 U.S.C. 154(b) by 0 days.

(21) Appl. No.: 17/774,860

(22) PCT Filed: Apr. 28, 2021

(86) PCT No.: PCT/JP2021/016901
§ 371 (c)(1),
(2) Date: May 6, 2022

(87) PCT Pub. No.: WO2021/235206
PCT Pub. Date: Nov. 25, 2021

(65) Prior Publication Data
US 2022/0393630 A1    Dec. 8, 2022

(30) Foreign Application Priority Data

May 18, 2020    (JP) ................................ 2020-086649

(51) Int. Cl.
*H02P 23/14*    (2006.01)
*H02P 25/03*    (2016.01)

(52) U.S. Cl.
CPC .............. *H02P 23/14* (2013.01); *H02P 25/03* (2016.02)

(58) Field of Classification Search
CPC ........... H02P 23/14; H02P 25/03; H02P 6/153
(Continued)

(56) References Cited

U.S. PATENT DOCUMENTS 9,013,128 B2 *   4/2015   Okamoto ................ H02P 6/182
                                                        318/400.11

FOREIGN PATENT DOCUMENTS

JP    H0662592       3/1994
JP    2002136168     5/2002
(Continued)

OTHER PUBLICATIONS

"International Search Report (Form PCT/ISA/210) of PCT/JP2021/016901," dated Jul. 13, 2021, with English translation thereof, pp. 1-4.
(Continued)

*Primary Examiner* — David Luo
(74) *Attorney, Agent, or Firm* — JCIPRNET

(57) ABSTRACT

A motor control device includes: a plurality of sensors detecting a rotation position of a rotor and outputting a position detection signal; a rotational speed determination part determining whether a rotational speed of a brushless motor is equal to or less than a predetermined threshold value based on the position detection signal; and a motor control part. An energization control part included in the motor control part uses, between a first mode and a second mode, different sensor signals serving as a trigger for an energization timing of each phase. In the first mode, an energization timing to a second phase is advanced relative to a timing at which the position detection signal of a first sensor turns on. In the second mode, an energization timing to the second phase is retarded relative to a timing at which the position detection signal of the first sensor turns on.

4 Claims, 12 Drawing Sheets

(58) Field of Classification Search
USPC .............................. 318/400.37, 400.01, 700
See application file for complete search history.

(56) References Cited

FOREIGN PATENT DOCUMENTS

| JP | 2018118661 | 8/2018 |
|----|------------|--------|
| JP | 2018133911 | 8/2018 |
| JP | 2019161933 | 9/2019 |

OTHER PUBLICATIONS

"International Preliminary Report On Patentability (Form PCT/IB/373) of PCT/JP2021/016901," dated Nov. 17, 2022, with English translation thereof, pp. 1-12.

* cited by examiner

MOTOR CONTROL DEVICE, MOTOR UNIT, AND MOTOR CONTROL METHOD

CROSS-REFERENCE TO RELATED APPLICATION

This application is a 371 application of the International PCT application serial no. PCT/JP2021/016901, filed on Apr. 28, 2021, which claims the priority benefits of Japan Patent Application No. 2020-086649, filed on May 18, 2020. The entirety of the above-mentioned patent application is hereby incorporated by reference herein and made a part of this specification.

TECHNICAL FIELD

The present invention relates to a motor control device, a motor unit, and a motor control method.

RELATED ART

A brushless motor includes a stator having three-phase coils U, V, and W and a rotor having a field permanent magnet, and is driven by controlling energization of the stator according to a rotation position of the rotor. The rotation position of the rotor is acquired, for example, by detecting a position of the magnetic pole of the rotor or a position of the magnetic pole of a sensor magnet rotating with the rotor by using a plurality of Hall sensors or the like.

As for the energization timing for each phase of the brushless motor, a count value is obtained by a timer in a microcomputer based on the detection signals obtained from each of these Hall sensors, and when the time is up (time counting is completed) based on this count value, a voltage is applied to the coil according to this energization timing. In the control of the energization timing for each phase of such a brushless motor, advance angle control is performed from the viewpoint of improving the motor output.

CITATION LIST

Patent Document

[Patent Document 1] Japanese Patent Application Laid-Open No. 2018-133911

SUMMARY OF INVENTION

Problem to be Solved by Invention

However, when the motor rotational speed is suddenly restrained from a normal driving state, the motor rotational speed decreases (decelerates). In such a case, since the motor rotational speed decreases, a time interval for position detection by the Hall sensor becomes long (the input of the detection signal is delayed). Then, as the time interval for position detection becomes long (the input timing of the detection signal is delayed), an error relative to the energization timing becomes large, so that the energization timing shifts with respect to the actual rotor position (becoming earlier). Further, a phenomenon of losing track of the position of the rotor occurs. Therefore, voltage is applied at an energization timing that is excessively advanced, which causes hunting and makes the motion of the motor unstable.

The present invention has been made in view of such circumstances, and an objective thereof is to provide a motor control device, a motor unit, and a motor control method capable of reducing instability in the motion of a motor during deceleration of a motor rotational speed.

Means for Solving Problem

To solve the above problem, according to an aspect of the present invention, a motor control device which controls rotation of a rotor by energizing a coil having a plurality of phases in a brushless motor includes a plurality of sensors, a rotational speed determination part, and a motor control part. The plurality of sensors detect a rotation position of the rotor and output a position detection signal. The rotational speed determination part determines whether a rotational speed of the brushless motor is equal to or less than a predetermined threshold value based on the position detection signal. The motor control part is capable of selecting a first mode selected when the rotational speed of the brushless motor exceeds the threshold value, and selecting a second mode selected when the rotational speed of the brushless motor is equal to or less than the threshold value. The motor control part has an energization control part which energizes the plurality of phases of the coil respectively at a predetermined energization timing set based on the position detection signal respectively of the plurality of sensors. When the energization control part energizes a first phase among the plurality of phases at a predetermined energization timing set based on the position detection signal of a first sensor among the plurality of sensors in the first mode, the energization control part energizes a second phase among the plurality of phases at a predetermined energization timing set based on the position detection signal of the first sensor in the second mode. In the first mode, an energization timing to the second phase is advanced with respect to a timing at which the position detection signal of the first sensor turns on, and in the second mode, an energization timing to the second phase is retarded with respect to a timing at which the position detection signal of the first sensor turns on.

Effects of Invention

As described above, according to the present invention, it is possible to reduce instability in the motion of the motor during deceleration of the motor rotational speed.

DESCRIPTION OF EMBODIMENTS

Figure 1:
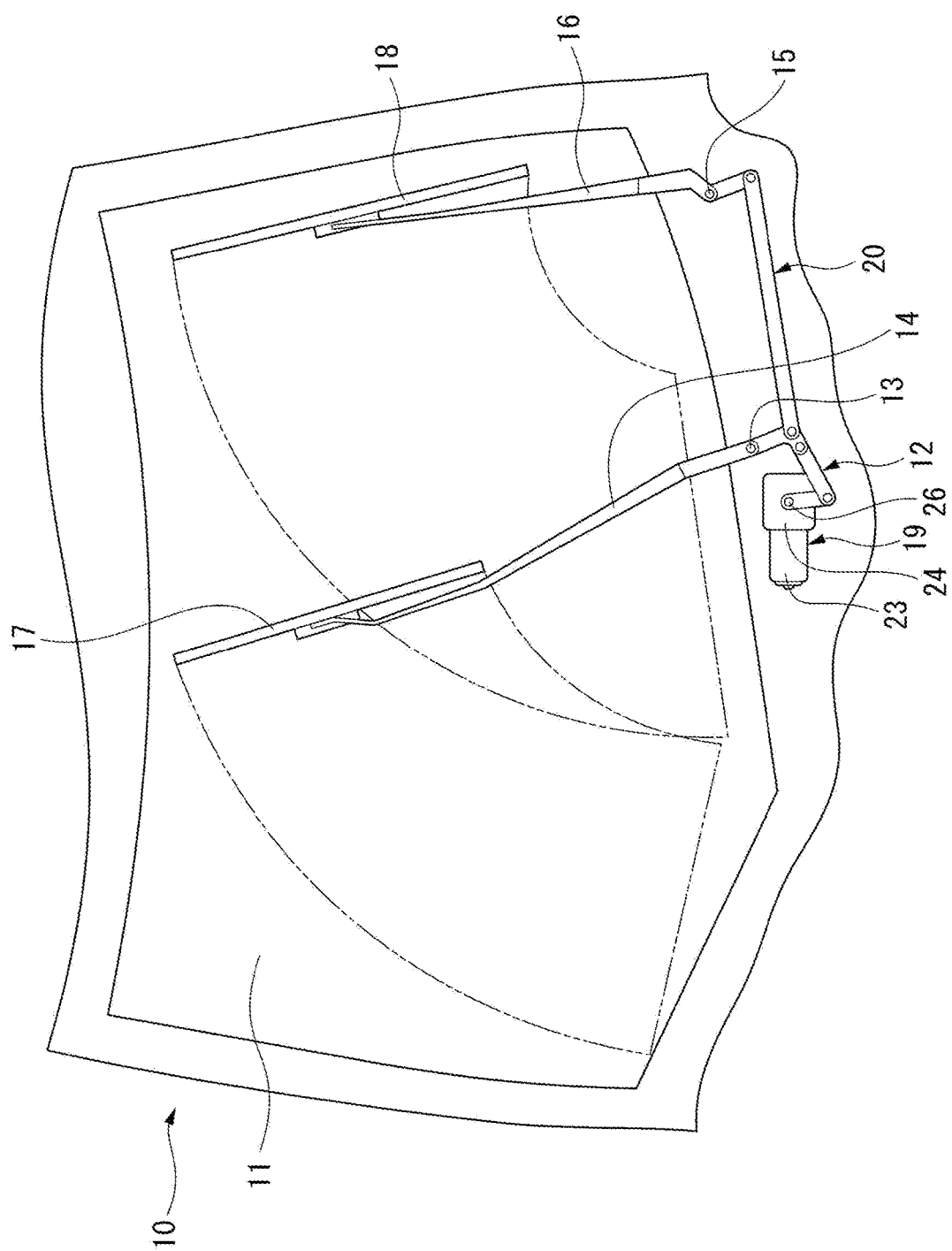
FIG. 1 is a view showing an example of a schematic configuration of a windshield 11 of a vehicle 10 mounted with a wiper device 12 including a motor control device according to this embodiment.

Hereinafter, aspects of the present invention will be described based on embodiments of the invention, but the following embodiments do not limit the invention as claimed. Further, not all combinations of features described in the embodiments are essential to the means of solution of the invention. In the drawings, the same or similar parts may be labeled with the same reference signs, and repeated descriptions may be omitted.

A motor control device of this embodiment controls a brushless motor. Such a brushless motor may be any of, for example, a brushless motor which swings a wiper arm, a brushless sunroof motor which opens and closes a roof panel, a brushless power window motor, and a brushless power seat motor.

Hereinafter, the motor control device according to this embodiment will be described with reference to the drawings. Herein, a case where a wiper arm is swung by using a brushless motor will be described as an example.

FIG. 1 is a view showing an example of a schematic configuration of a windshield 11 of a vehicle 10 mounted with a wiper device 12 including a motor control device according to this embodiment.

As shown in FIG. 1, the vehicle 10 includes the windshield 11 and the wiper device 12.

The wiper device 12 wipes the windshield 11.

The wiper device 12 includes wiper arms 14 and 16, wiper blades 17 and 18, a motor unit 19, and a power transmission mechanism 20.

The wiper arm 14 swings around a pivot shaft 13. The wiper arm 16 swings around a pivot shaft 15.

The wiper blade 17 is attached to a free end of the wiper arm 14. The wiper blade 18 is attached to a free end of the wiper arm 16.

The motor unit 19 drives the wiper arms 14 and 16. In this embodiment, the power of the motor unit 19 is individually transmitted to the wiper arms 14 and 16 via the power transmission mechanism 20 composed of levers, links, etc.

Figure 2:
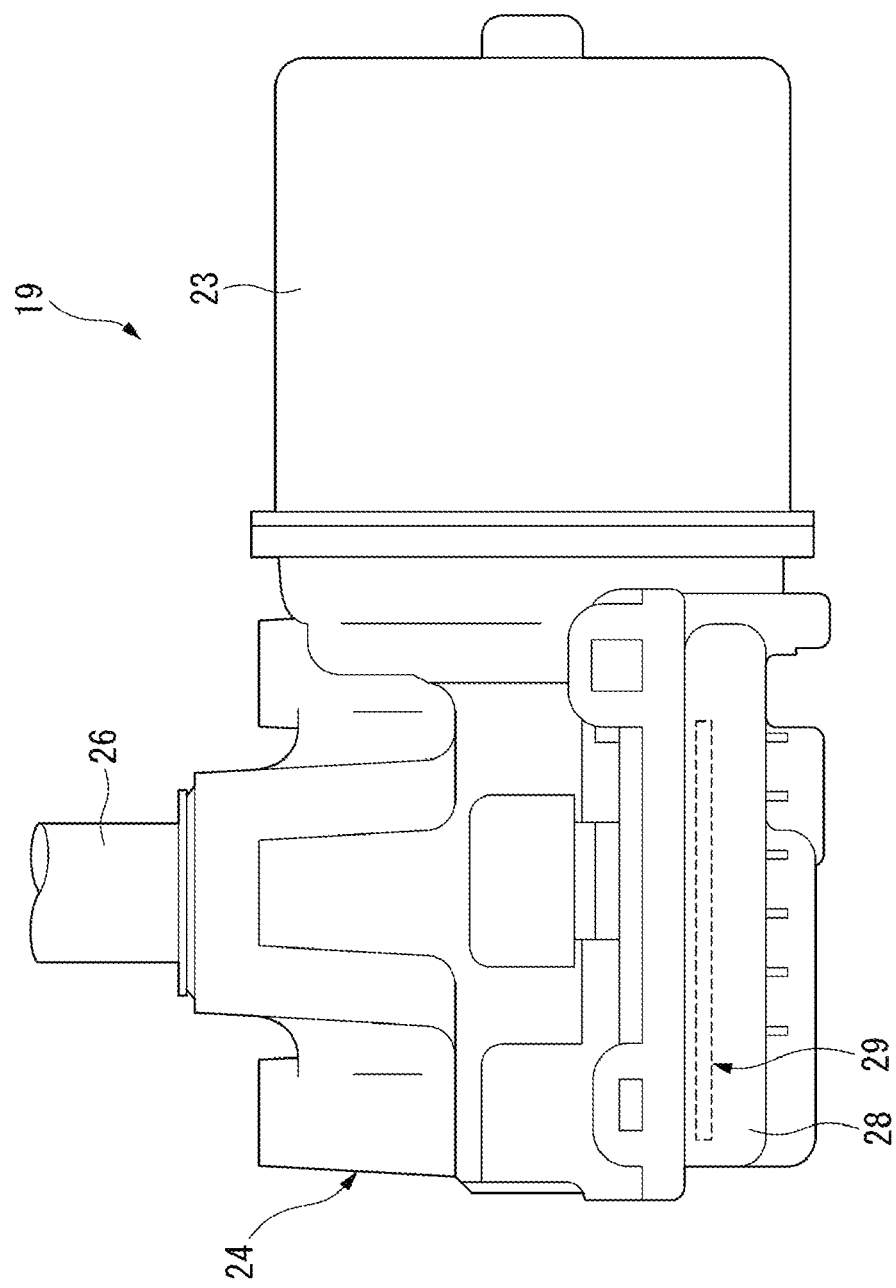
FIG. 2 is a view showing an example of the appearance of a motor unit 19 according to this embodiment.
Figure 3:
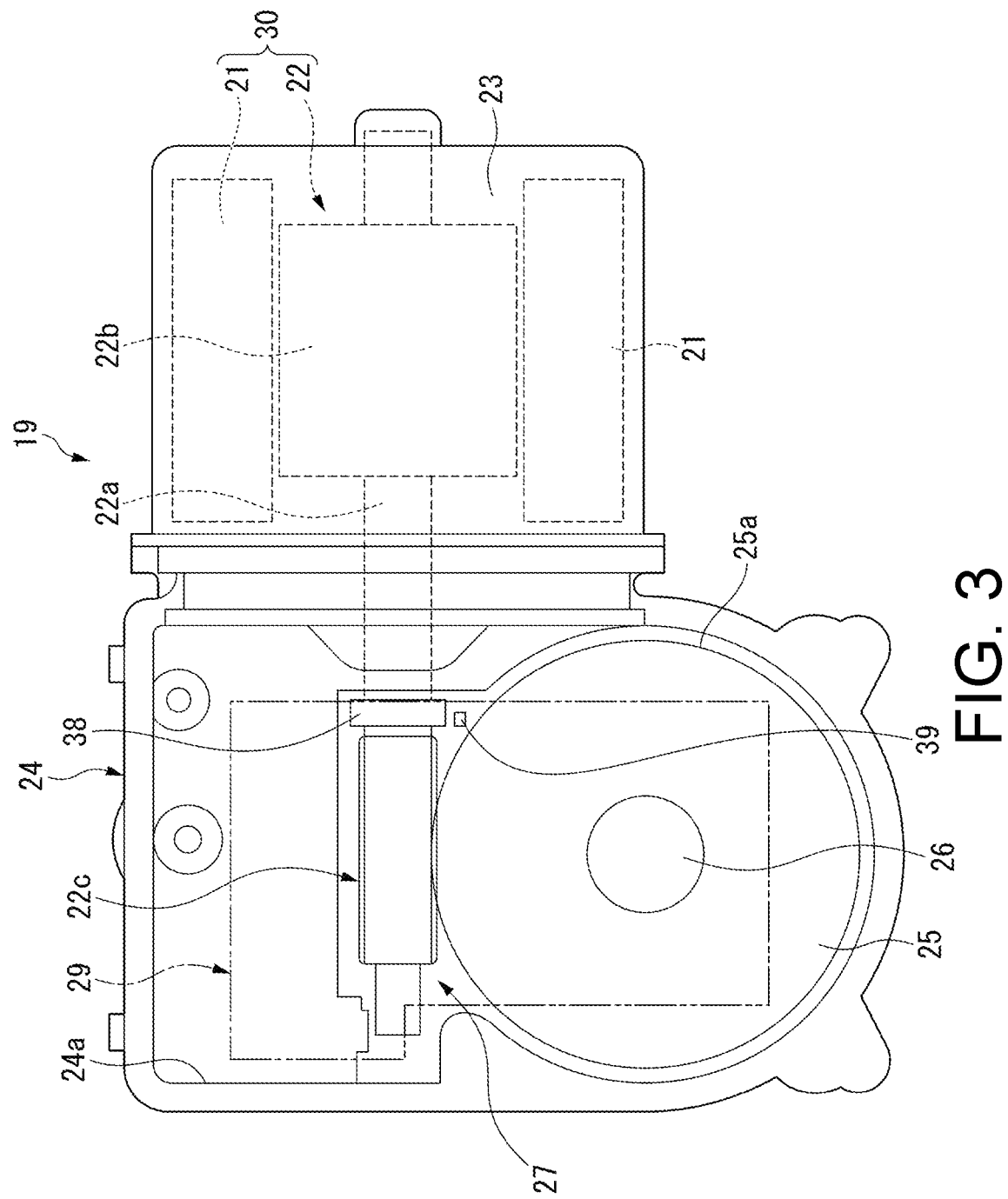
FIG. 3 is a bottom view of the motor unit 19 with an undercover 28 removed.

FIG. 2 is a view showing an example of the appearance of the motor unit 19 according to this embodiment. FIG. 3 is a bottom view of the motor unit 19 shown in FIG. 2 with an undercover 28 removed.

As shown in FIG. 2, the appearance of the motor unit 19 is mainly composed of a case 23 and a frame 24.

The case 23 has a bottomed cylindrical shape. The frame 24 has a hollow shape. The frame 24 and the case 23 are fixed by a fastening member (not shown).

As shown in FIG. 3, the motor unit 19 includes a brushless motor 30, a rotor shaft 22a, an opening 24a, a worm wheel 25, an output shaft 26, a deceleration mechanism 27, an undercover 28, a control board 29, a sensor magnet 38, and a motor control device 33.

The brushless motor 30 causes the wiper arms 14 and 16 to swing based on a control instruction of the motor control device 33.

For example, the brushless motor 30 is a three-phase four-pole brushless motor.

The brushless motor 30 includes a stator 21 and a rotor 22.

The stator 21 is fixed to the inner periphery of the case 23. The stator 21 includes three-phase armature coils $21u$, $21v$, and $21w$. The armature coils $21u$, $21v$, and $21w$ are wound around the stator 21. For example, the three-phase armature coils $21u$, $21v$, and $21w$ are connected by a delta connection connected at a neutral point at one end. However, the connection is not limited to the delta connection but may also be a Y connection. Further, the brushless motor 30 is a motor in which each armature coil $21u$, $21v$, and $21w$ functions as both a positive electrode and a negative electrode.

For example, the rotor 22 is provided on the inner side of the stator 21. The rotor 22 includes a rotor shaft 22a and a four-pole permanent magnet 22b attached to the rotor shaft 22a. A plurality of bearings (not shown) are provided in the case 23, and the rotor shaft 22a is rotatably supported by the plurality of bearings.

As shown in FIG. 3, the rotor 22 has an inner rotor type structure arranged on the inner side of the stator 21, but the rotor 22 may also have an outer rotor type structure arranged on the outer side of the stator 21.

A substantial half of the rotor shaft 22a in a length direction is arranged inside the case 23, and the other substantial half is arranged inside the frame 24.

The deceleration mechanism 27 is formed on the outer periphery of a portion of the rotor shaft 22a that is arranged in the frame 24. The deceleration mechanism 27 includes a worm 22c and a gear 25a.

The worm 22c is provided on the outer periphery of the rotor shaft 22a arranged in the frame 24. The gear 25a is formed on the outer periphery of the worm wheel 25 provided in the frame 24. The gear 25a is meshed with the worm 22c.

The worm wheel 25 is configured to rotate integrally with the output shaft 26. When the power of the rotor 22 is transmitted to the output shaft 26, the deceleration mechanism 27 reduces the rotational speed (output rotational speed) of the output shaft 26 to be lower than the rotational speed (input rotational speed) of the rotor 22. Further, in FIG. 2, a shaft hole (not shown) is provided in an upper part of the frame 24. An end of the output shaft 26 opposite to an end at which the worm wheel 25 is fixed is exposed to the outside via the shaft hole of the frame 24. As shown in FIG. 1, the power transmission mechanism 20 is connected to the portion of the output shaft 26 exposed to the outside of the frame 24.

The opening 24a is provided in a portion of the frame 24 on the opposite side of the shaft hole. The opening 24a is formed for mounting the worm wheel 25 and the like inside the frame 24. The undercover 28 is provided to close the opening 24a. The undercover 28 has a tray shape.

The control board 29 is provided in a space surrounded by the undercover 28 and the frame 24. As shown in FIG. 2, for example, the control board 29 is attached to the undercover 28. The control board 29 is provided with the motor control device 33 which controls the brushless motor 30.

The sensor magnet 38 is provided at a position on the rotor shaft 22a arranged in the frame 24. The sensor magnet 38 rotates integrally with the rotor shaft 22a. The sensor magnet 38 is magnetized so that the N pole and the S pole are alternately arranged along the circumferential direction of the rotor shaft 22a.

Hereinafter, the motor control device 33 according to this embodiment will be described with reference to the drawings.

Figure 4:
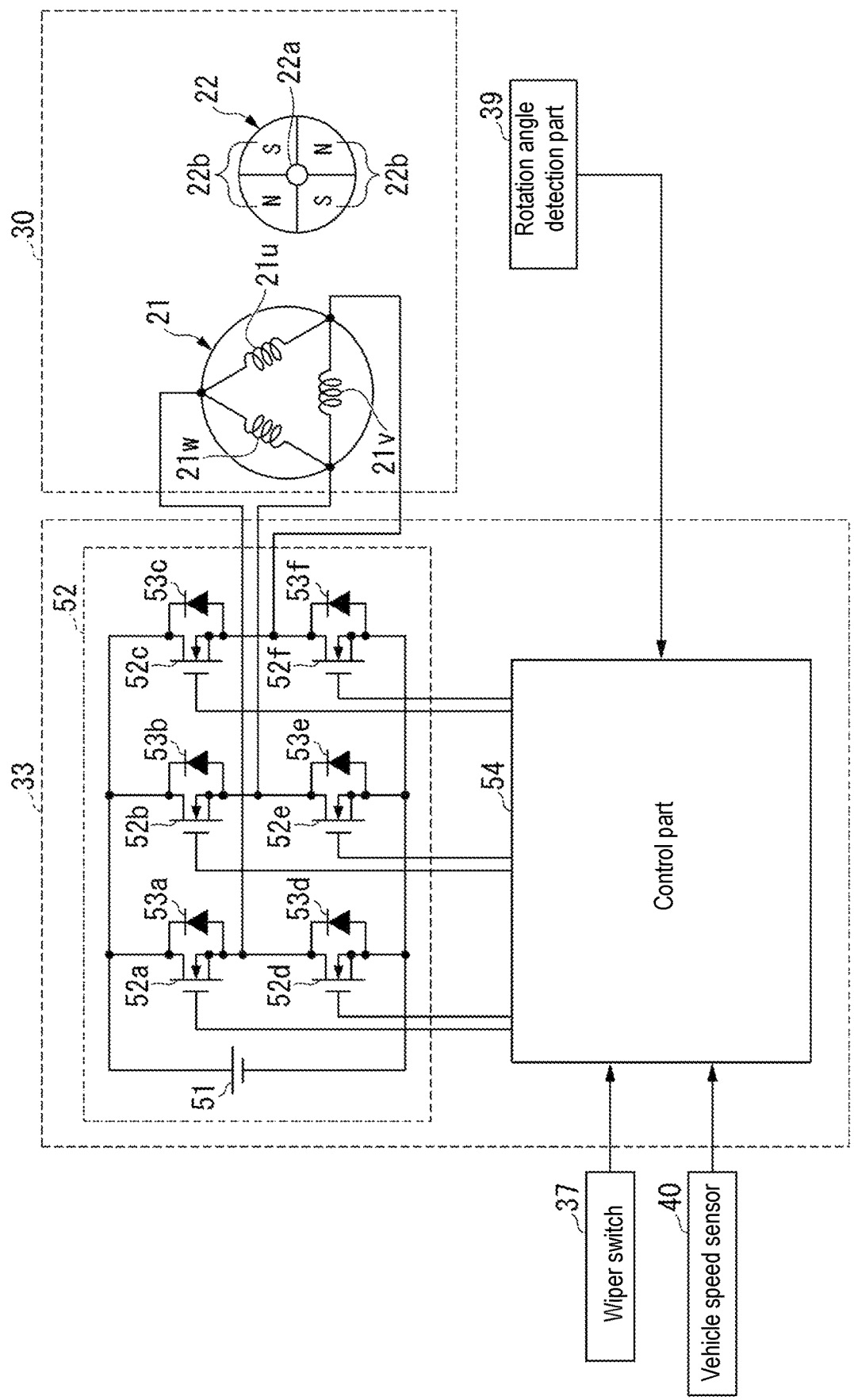
FIG. 4 is a view showing an example of a schematic configuration of a control system of the wiper device 12 according to this embodiment.

FIG. 4 is a view showing an example of a schematic configuration of a control system of the wiper device 12 according to this embodiment. The wiper device 12 includes a wiper switch 37, a rotation angle detection part 39, a vehicle speed sensor 40, and a motor control device 33.

The wiper switch 37 is provided in the vehicle interior of the vehicle 10.

The wiper switch 37 is a switch which causes the wiper arms 14 and 16 to swing.

The wiper switch 37 may switch between a low speed operation mode in which the wiper arms 14 and 16 are operated at a low speed (e.g., a preset speed), a high speed operation mode in which the wiper arms 14 and 16 are operated at a speed higher than the low speed operation mode, and a stop mode in which the swinging operation of the wiper arms 14 and 16 is stopped.

The wiper switch 37 is operated by the driver to output an operation signal indicating the operation to the motor control device 33. For example, the driver may switch a wiping speed of the wiper arms 14 and 16 by operating the wiper switch 37 based on conditions such as the amount of rainfall and the amount of snowfall. When the amount of rainfall or the amount of snowfall is little, by operating the wiper switch 37, the driver may select the low speed operation mode in which the wiper arms 14 and 16 are operated at a predetermined low speed. In this case, based on the driver's operation of selecting the low speed operation mode, the wiper switch 37 outputs a low speed operation mode signal indicating the low speed operation mode to the motor control device 33 as the operation signal.

On the other hand, when the amount of rainfall or the amount of snowfall is a lot, the driver may operate the wiper switch 37 to select the high speed operation mode in which the wiper arms 14 and 16 are operated at a speed higher than the low speed above. In this case, based on the driver's operation of selecting the high speed operation mode, the wiper switch 37 outputs a high speed operation mode signal indicating the high speed operation mode to the motor control device 33 as the operation signal.

Further, when the driver performs an operation on the wiper switch 37 to stop the swinging operation of the wiper arms 14 and 16, the wiper switch 37 outputs a stop mode signal indicating the stop mode to the motor control device 33 as the operation signal.

The vehicle speed sensor 40 is provided in the vehicle 10. The vehicle speed sensor 40 measures a traveling speed (hereinafter referred to as a "vehicle speed") V of the vehicle 10. The vehicle speed sensor 40 outputs the measured vehicle speed V of the vehicle 10 to the motor control device 33.

The rotation angle detection part 39 detects a signal corresponding to the rotation of the rotor 22. For example, the rotation angle detection part 39 includes three Hall ICs (U-phase sensor, V-phase sensor, and W-phase sensor) provided at positions magnetically 120 degrees from each other centered on the rotor shaft 22a. When the rotor 22 rotates, the three Hall ICs output pulse signals which are 120 degrees phase-shifted with each other to the motor control device 33.

That is, the rotation angle detection part 39 generates pulse signals based on changes in the magnetic pole of the sensor magnet 38 as the rotor 22 rotates, and outputs the pulse signals to the motor control device 33.

The motor control device 33 includes an inverter 52 and a control part 54.

The inverter 52 includes six switching elements 52a to 52f connected in a three-phase bridge, and diodes 53a to 53f connected in antiparallel between collectors and emitters respectively of the switching elements 52a to 52f. Each switching element 52a to 52f is, for example, an FET (field effect transistor) or an IGBT (insulated gate bipolar transistor). Each gate of the bridge-connected six switching elements 52a to 52f is connected to the control part 54.

The drain or source (collector or emitter) of the switching elements 52a to 52f is connected to the delta-connected armature coils 21u, 21v, and 21w. Accordingly, the six switching elements 52a to 52f perform a switching operation based on a drive signal (gate signal) outputted from the control part 54, and takes a power supply voltage of a DC power supply 51 applied to the inverter 52 as a three-phase (U-phase, V-phase, and W-phase) AC voltage to supply to the armature coils 21u, 21v, and 21w as an energization signal.

The control part 54 determines a rotation position of the rotor 22 based on the pulse signal supplied from the rotation angle detection part 39. Further, the control part 54 detects a rotational speed of the rotor 22 based on the pulse signal.

Hereinafter, the control part 54 according to this embodiment will be described with reference to FIG. 5.

Figure 5:
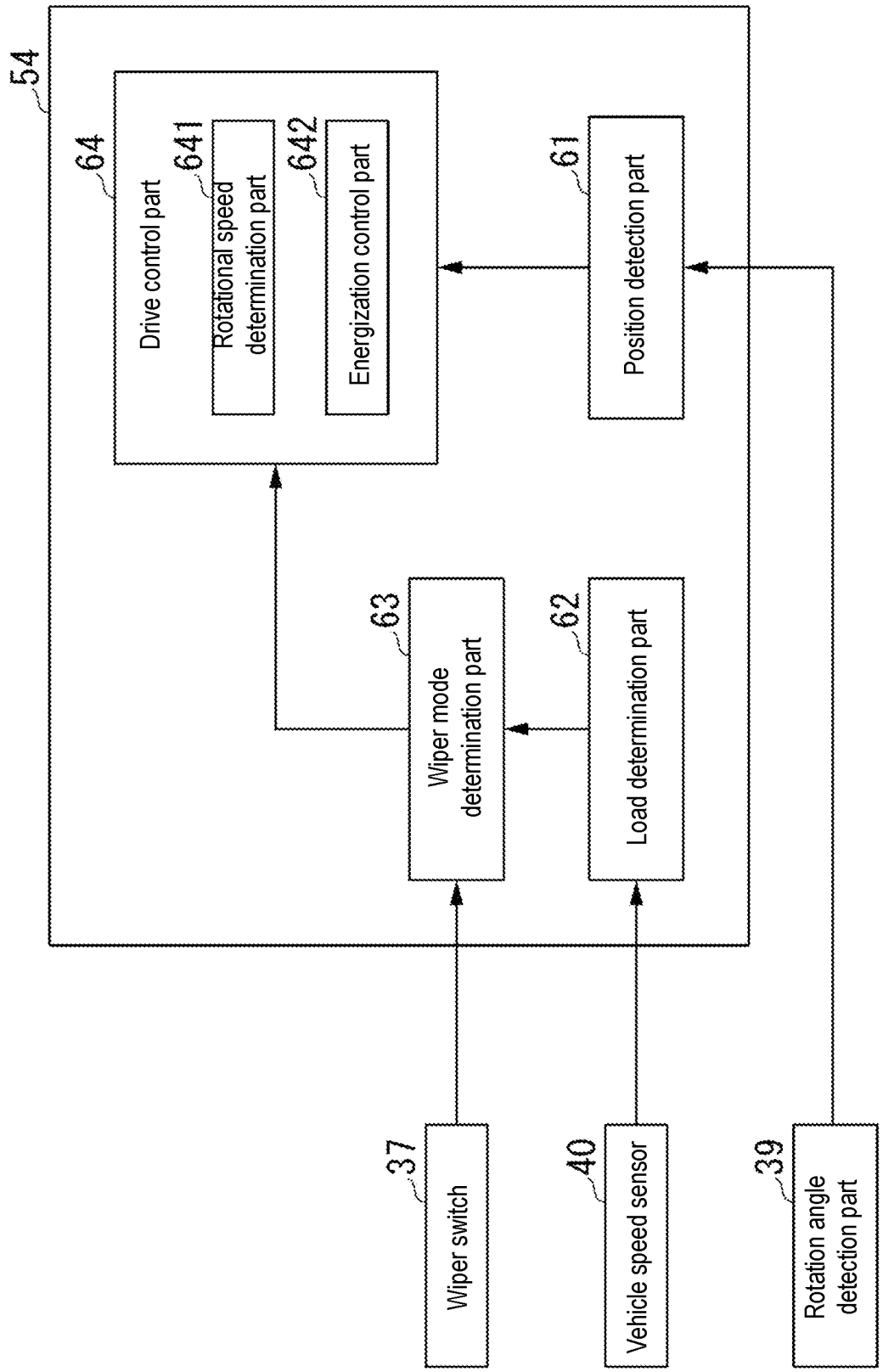
FIG. 5 is a view showing an example of a schematic configuration of a control part 54 according to this embodiment.

FIG. 5 is a view showing an example of a schematic configuration of the control part 54 according to this embodiment.

The control part 54 includes a position detection part 61, a load determination part 62, a wiper mode determination part 63, and a drive control part 64.

The position detection part 61 detects a rotation position of the rotor 22 based on the pulse signal supplied from the rotation angle detection part 39. The position detection part 61 outputs the detected rotation position of the rotor 22 to the drive control part 64.

The load determination part 62 determines whether a load applied to the brushless motor is a high load.

For example, the load determination part 62 refers to determination data in which an output duty of the voltage applied to the motor and an overload determination reference value are associated with each other to read out an overload determination reference value of the output duty corresponding to a current rotor rotational speed, and determine whether the output duty of the voltage currently applied to the motor exceeds the read overload determination reference value. Herein, when the current output duty exceeds the overload determination reference value, the load determination part 62 determines that it is an overload state. That is, the load determination part 62 determines that the load applied to the brushless motor is a high load. On the other hand, when the current output duty does not exceed the overload determination reference value, the load determination part 62 determines that it is not a high load. The determination data may be stored in a storage part provided in the control part 54, and the load determination part 62 may refer to this storage part.

Further, the load determination part 62 may determine whether the load is a high load based on the output duty, but the detection of the high load state may also be performed by using an output from the vehicle speed sensor 40.

In this case, the load determination part 62 determines whether the vehicle speed V measured by the vehicle speed sensor 40 exceeds a predetermined value Vth set in advance. When the vehicle speed V measured by the vehicle speed sensor 40 exceeds the predetermined value Vth, the load determination part 62 determines that the load of the brushless motor 30 is a high load. When the load determination part 62 determines that the load of the brushless motor 30 is a high load, the load determination part 62 outputs a high load signal indicating the determination result to the wiper mode determination part 63. This is because when the vehicle speed V of the vehicle 10 increases, the air volume to the windshield 11 of the vehicle 10 increases, and the movement of the wiper blades 17 and 18 wiping the windshield 11 is hindered.

The wiper mode determination part 63 determines whether the brushless motor 30 is to be driven in a low output mode, the brushless motor 30 is to be driven in a high output mode, or the driving of the brushless motor 30 is to be stopped.

When the wiper mode determination part 63 acquires the low speed operation mode signal from the wiper switch 37, the wiper mode determination part 63 determines that the brushless motor 30 is to be driven in the low output mode, and outputs a low output mode signal indicating the low output mode to the drive control part 64.

When the wiper mode determination part 63 acquires the high speed operation mode signal from the wiper switch 37, the wiper mode determination part 63 determines that the brushless motor 30 is to be driven in the high output mode, and outputs a high output mode signal indicating the high output mode to the drive control part 64. Further, when the wiper mode determination part 63 acquires the high load signal from the load determination part 62, the wiper mode determination part 63 determines that the brushless motor 30 is to be driven in the high output mode, and outputs a high output mode signal indicating the high output mode to the drive control part 64.

When the wiper mode determination part 63 acquires the stop mode signal from the wiper switch 37, the wiper mode determination part 63 makes a determination of stopping the driving of the brushless motor 30, and outputs a stop signal indicating the stop of the driving of the brushless motor 30 to the drive control part 64.

The drive control part 64 includes a rotational speed determination part 641 and an energization control part 642.

The rotational speed determination part 641 determines whether the rotational speed of the brushless motor 30 is equal to or less than a predetermined threshold value.

This threshold value may be, for example, a speed a certain time before the motor locks. When a speed a certain time before the motor locks is used as the threshold value, the rotational speed determination part 641 may learn that the rotational speed of the motor is a speed a short time before a motor lock and the motor is likely to lock. This threshold value may be set arbitrarily.

The energization control part 642 energizes the three-phase armature coils 21u, 21v, and 21w respectively at a predetermined energization timing set based on the position detection signal outputted by the Hall IC of the rotation angle detection part 39. That is, with a timer provided in the control part 54, the energization control part 642 performs counting with an on or off timing of the position detection signal serving as a start point, and energizes the three-phase armature coils 21u, 21v, and 21w at a timing of a predetermined timer count value. This timer count value is a value calculated from a record of an on or off timing of a position detection signal one cycle before in the rotation of the rotor 22. Accordingly, the energization control part 642 makes the energization timing variable according to the rotational speed. When the rotational speed of the motor is a constant speed or is accelerating, the energization control part 642 performs advance angle control of energizing at an advance angle timing based on the position detection signal obtained from the Hall IC, and when the motor is decelerating, before the motor stops, the energization control part 642 performs retard angle control of energizing at a retard angle timing based on the position detection signal obtained from the Hall IC.

Specifically, the energization control part 642 may select an advance angle control mode (first mode) selected when the rotational speed of the brushless motor 30 exceeds the predetermined threshold value according to the rotational speed determination part 641, and select a retard angle control mode (second mode) selected when the rotational speed of the brushless motor 30 is equal to or less than the predetermined threshold value.

In the case where, in the advance angle control mode, the energization control part 642 energizes one phase (first phase) among the three-phase armature coils 21u, 21v, and 21w at a predetermined energization timing set based on the position detection signal of one Hall IC (first sensor) among the three Hall ICs, in the retard angle control mode, the energization control part 642 energizes a second phase different from the first phase among the three-phase armature coils 21u, 21v, and 21w at a predetermined energization timing set based on the position detection signal of the first sensor. Then, the energization control part 642 performs energization so that, in the advance angle control mode, the energization timing to the second phase is advanced with respect to the timing at which the position detection signal of the first sensor turns on, and in the retard angle control mode, the energization timing to the second phase is retarded with respect to the timing at which the position detection signal of the first sensor turns on.

In general motor control, advance angle control is performed to advance the energization timing according to the rotational speed with respect to the position of the rotor which is based on the position detection signal outputted from the Hall IC; however, as described above, this embodiment involves a (retard angle) control method of retarding the energization timing with respect to the position indicated by the position detection signal in a low speed region (during deceleration).

The retard angle referred to herein is a timing by which the electric angle is late based on the timing at which the position detection signal is obtained.

Therefore, according to this embodiment, by performing retard angle energization in the low speed region (during deceleration), even if the input of the position detection signal is retarded during deceleration, it is possible to prevent application of voltage at an energization timing that is excessively advanced with respect to the actual rotor position.

The energization control part 642 may have a start mode of driving the motor from a state in which the rotor is substantially stopped and the position of the rotor cannot be estimated. In this start mode, reference energization may be performed to energize and drive at a timing synchronized with the position detection signal of the Hall IC.

When the brushless motor 30 has a high load, the rotational speed of the brushless motor 30 is equal to or less than the threshold value, and the brushless motor 30 is driven in the advance angle control mode, the energization control part 642 switches from the advance angle control mode to the retard angle control mode. By switching to the retard angle control mode, retard angle control can be performed.

A specific example of the control performed by the energization control part 642 will be described with reference to FIG. 6 and FIG. 7.

Figure 6:
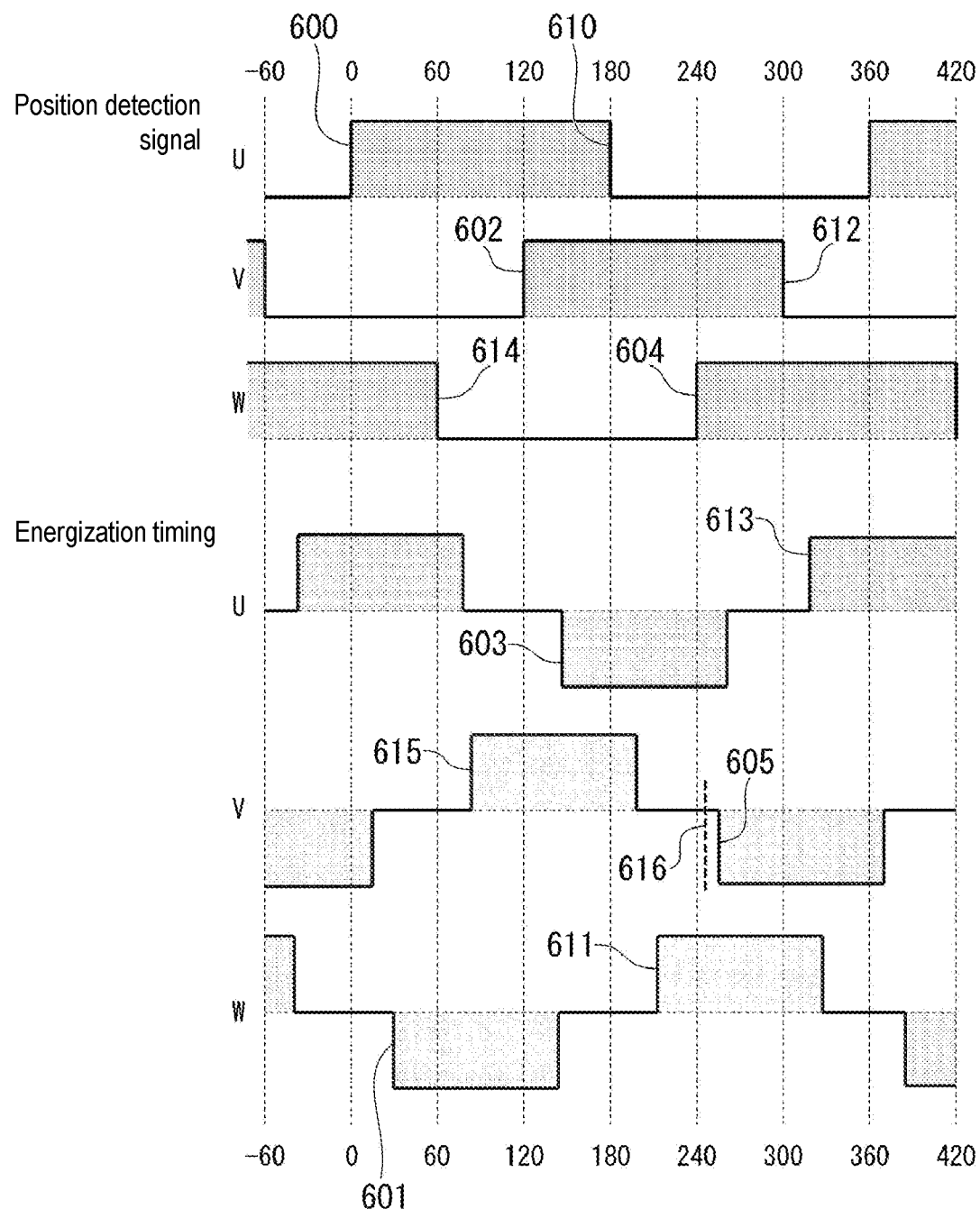
FIG. 6 is a timing chart showing a relationship between a position detection signal obtained from a rotation angle detection part and an energization timing of U, V, and W phases in an advance angle control mode.
Figure 7:
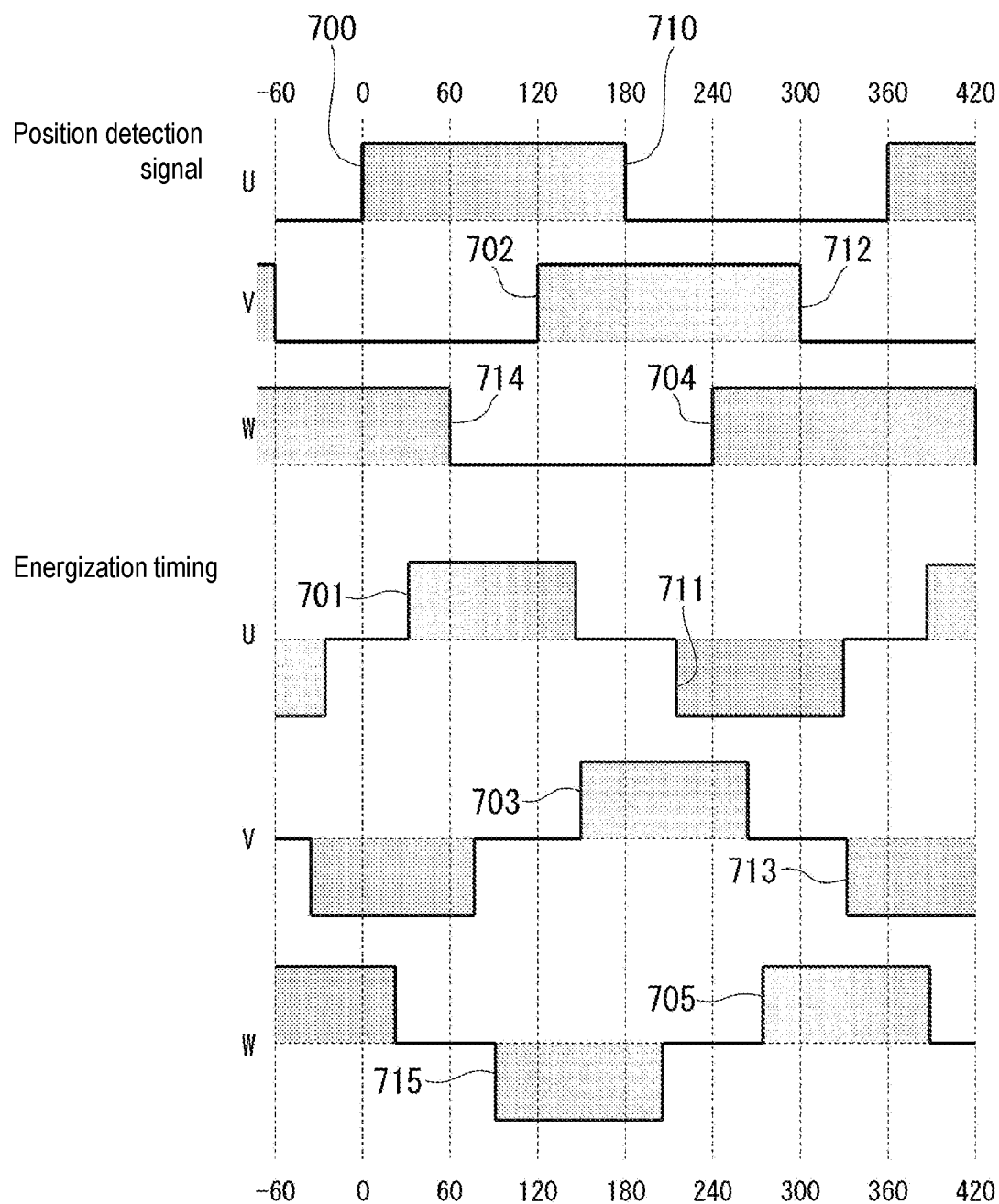
FIG. 7 is a timing chart showing a relationship between a position detection signal obtained from the rotation angle detection part 39 and an energization timing of U, V, and W phases in a retard angle control mode.

FIG. 6 and FIG. 7 are timing charts showing a relationship between a position detection signal obtained from the Hall IC (U-phase sensor, V-phase sensor, and W-phase sensor) of the rotation angle detection part 39, and an energization timing to each phase of the armature coil 21u (U phase), the armature coil 21v (V phase), and the armature coil 21w (W phase).

FIG. 6 is a timing chart showing a relationship between a position detection signal and an energization timing in the case of performing advance angle control as in the conventional art during a constant speed or acceleration of the brushless motor 30, i.e., in the advance angle control mode. At an electric angle of 0°, when the position detection signal of the U-phase sensor turns on (reference sign 600), the energization control part 642 starts counting with the timer, ends the counting after counting the predetermined timer count value, and starts energization of a negative voltage to the W phase (reference sign 601) at the same time as the counting ends. Further, at an electric angle of 120°, when the position detection signal of the V-phase sensor turns on (reference sign 602), the energization control part 642 starts counting with the timer, ends the counting after counting the predetermined timer count value, and starts energization of a negative voltage to the U phase (reference sign 603) at the same time as the counting ends. Further, at an electric angle of 240°, when the position detection signal of the W-phase sensor turns on (reference sign 604), the energization control part 642 starts counting with the timer, ends the counting after counting the predetermined timer count value, and starts energization of a negative voltage to the V phase (reference sign 605) at the same time as the counting ends.

Further, at an electric angle of 180°, when the position detection signal of the U-phase sensor turns off (reference sign 610), the energization control part 642 starts counting with the timer, ends the counting after counting the predetermined timer count value, and starts energization of a positive voltage to the W phase (reference sign 611) at the same time as the counting ends. Further, at an electric angle of 300°, when the position detection signal of the V-phase sensor turns off (reference sign 612), the energization control part 642 starts counting with the timer, ends the counting after counting the predetermined timer count value, and starts energization of a positive voltage to the U phase (reference sign 613) at the same time as the counting ends. Further, at an electric angle of 60°, when the position detection signal of the W-phase sensor turns off (reference sign 614), the energization control part 642 starts counting with the timer, ends the counting after counting the predetermined timer count value, and starts energization of a positive voltage to the V phase (reference sign 615) at the same time as the counting ends.

Accordingly, the energization timing to the U phase is advanced with respect to the timing at which the U-phase sensor turns on or off. Further, the energization timing to the V phase is advanced with respect to the timing at which the V-phase sensor turns on or off. Further, the energization timing to the W phase is advanced with respect to the timing at which the W-phase sensor turns on or off.

Next, a case where the advance angle control above is continuously performed even if the rotational speed of the brushless motor 30 becomes equal to or less than the predetermined threshold value will be described with reference to FIG. 6.

When the position detection signal of the W-phase sensor turns on (reference sign 604), the energization control part 642 starts counting with the timer. Since the timer count value used at this time is calculated from the data one cycle before, if the rotational speed of the brushless motor 30 becomes equal to or less than the predetermined threshold value during this period, the counting would end before the rotor 22 reaches the expected angle, and the energization timing to the V phase would be excessively advanced (reference sign 616).

Such a shift in the energization timing may occur not only when the position detection signal of the W-phase sensor turns on but also at the timing when the position detection signal turns off.

Further, such a shift in the energization timing may occur not only in the W phase but also in any of the V phase and the U phase.

In contrast, in this embodiment, the energization control part 642 performs retard angle control during deceleration.

FIG. 7 is a timing chart showing a relationship between a position detection signal and an energization timing when the energization control part 642 performs retard angle control during deceleration of the brushless motor 30, i.e., in the retard angle control mode.

At an electric angle of 0°, when the position detection signal of the U-phase sensor turns on (reference sign 700), the energization control part 642 starts counting with the timer, ends the counting after counting the predetermined timer count value, and starts energization of a positive voltage to the U phase (reference sign 701) at the same time as the counting ends. At an electric angle of 120°, when the position detection signal of the V-phase sensor turns on (reference sign 702), the energization control part 642 starts counting with the timer, ends the counting after counting the predetermined timer count value, and starts energization of a positive voltage to the V phase (reference sign 703) at the same time as the counting ends. At an electric angle of 240°, when the position detection signal of the W-phase sensor turns on (reference sign 704), the energization control part 642 starts counting with the timer, ends the counting after counting the predetermined timer count value, and starts energization of a positive voltage to the W phase (reference sign 705) at the same time as the counting ends.

Further, at an electric angle of 180°, when the position detection signal of the U-phase sensor turns off (reference sign 710), the energization control part 642 starts counting with the timer, ends the counting after counting the predetermined timer count value, and starts energization of a negative voltage to the U phase (reference sign 711) at the same time as the counting ends. Further, at an electric angle of 300°, when the position detection signal of the V-phase sensor turns off (reference sign 712), the energization control part 642 starts counting with the timer, ends the counting after counting the predetermined timer count value, and starts energization of a negative voltage to the V phase (reference sign 713) at the same time as the counting ends. Further, at an electric angle of 60°, when the position detection signal of the W-phase sensor turns off (reference sign 714), the energization control part 642 starts counting with the timer, ends the counting after counting the predetermined timer count value, and starts energization of a negative voltage to the W phase (reference sign 715) at the same time as the counting ends.

Accordingly, the energization timing to the U phase is retarded with respect to the timing at which the U-phase sensor turns on or off. Further, the energization timing to the V phase is retarded with respect to the timing at which the V-phase sensor turns on or off. Further, the energization timing to the W phase is retarded with respect to the timing at which the W-phase sensor turns on or off.

Herein, the timer count value in the retard angle control mode is a value calculated from a record of an on or off timing of the position detection signal one cycle before, as in the advance angle control mode.

In this manner, in advance angle control, the on or off timing of the position detection signal of a sensor (Hall IC) different from the sensor (Hall IC) that outputs the position detection signal serving as the reference of the advance angle is taken as the start point to perform the counting. For example, the on or off timing of the position detection signal (reference sign 610) of a sensor (U-phase sensor) different from the sensor (W-phase sensor) that outputs the position detection signal (reference sign 604) serving as the reference of the advance angle is taken as the start point to perform the counting, and based on the result of this counting, energization is performed to turn on or off the W phase. That is, when performing energization control of the W phase, the position detection signal from the sensor (herein, the U-phase sensor) of a phase different from the W phase is used as the start point of the counting. Similarly, when performing energization control of the U phase, the position detection signal from the sensor (herein, the V-phase sensor) of a phase different from the U phase is used as the start point of the counting, and when performing energization control of the V phase, the position detection signal from the sensor (herein, the W-phase sensor) of a phase different from the V phase is used as the start point of the counting. Therefore, if advance angle control is performed during deceleration, since advance angle control is performed in a next cycle of the position detection signal using the timer count value of the position detection signal one cycle before, even if the time timer-counted based on the electric angle elapses, the rotation angle of the rotor only rotates by an angle less than the electric angle. Therefore, since the sensor signal input (e.g., the position detection signal (reference sign 604)) serving as the reference of the advance angle is later than the expected timing, the timing of energization by the advance angle (e.g., reference sign 611) and the timing of the sensor signal input (e.g., the position detection signal (reference sign 604)) are opened, and as a result, an excessive advance angle is obtained.

On the other hand, according to this embodiment, since retard angle control is performed during deceleration, it is possible to always wait for energization until a next position detection signal is inputted. In other words, in deceleration control, the on or off timing of the position detection signal of the same sensor (Hall IC) as the sensor (Hall IC) that outputs the position detection signal serving as the reference of the retard angle is taken as the start point to perform the counting. As described above, the sensor signal used as a trigger of the energization timing in the advance angle control is different from the sensor signal used as a trigger of the energization timing in the retard angle control. Accordingly, when the control part 54 detects that the rotational speed is decreasing (an interval between detection times of the position detection signal becomes wider) based on the position detection signal obtained the time before last time and the position detection signal obtained last time, it is possible to energize at a timing retarded by the electric angle based on the timing at which the position detection signal obtained this time is obtained. Therefore, even if the rotational speed of the motor changes to decrease during deceleration, it is possible to perform control based on the information of a newer rotation position. Accordingly, it is possible to alleviate a shift in the energization timing even in the deceleration state of the motor, and it is possible to prevent hunting.

Further, according to this configuration, since the electric angle is retarded during deceleration, energization is always started after the position detection signal of the Hall IC is inputted even during motor deceleration. Accordingly, the rotor position information calculated based on the timer count value is updated when the position detection signal of the Hall IC is inputted, and as it becomes possible to learn the accurate rotor position even during motor deceleration, hunting can be prevented and the motion of the motor is stabilized.

Further, when performing retard angle control, as the range of the electric angle to be retarded, it is desirable that the electric angle is 0°<θ<30° based on the position detection signal. If 30°<θ<60°, there is a possibility that the shift in the energization timing due to deceleration of the motor may not be suppressed.

Figure 8:
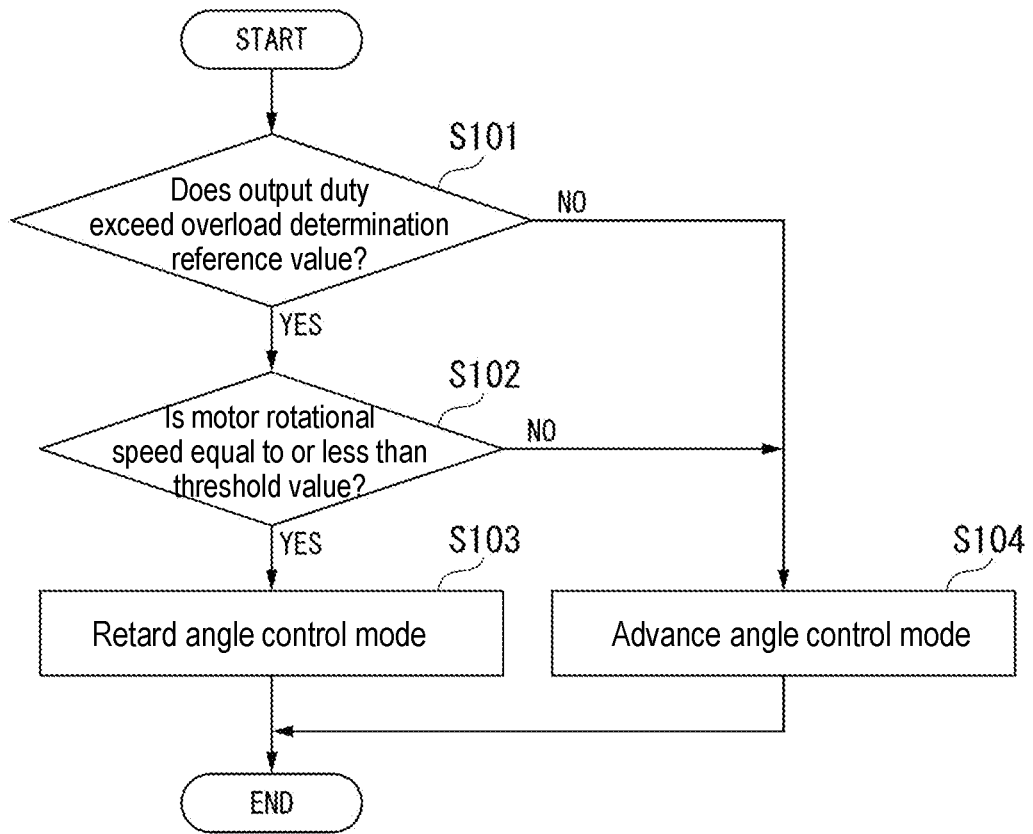
FIG. 8 is a flowchart illustrating the operation of a motor control device 33.

Next, FIG. 8 is a flowchart illustrating the operation of the control part 54.

The control part 54 determines, by the load determination part 62, whether an output duty exceeds an overload determination reference value (step S101). When the output duty exceeds the overload determination reference value (step S101-YES), the control part 54 determines, by the rotational speed determination part 641, whether a rotational speed of the brushless motor 30 is equal to or less than a predetermined threshold value (step S102).

Then, when the rotational speed of the brushless motor 30 is equal to or less than the threshold value (step S102-YES), the control part 54 shifts to the retard angle control mode.

For example, when the rotational speed of the motor is decelerating, especially when the motor rotational speed is equal to or less than the threshold value, since it can be determined that the motor is in a state immediately before locking, the current delay with respect to the applied voltage is close to zero. In such a situation, even if retard angle control is performed, there is almost no difference in the current delay with respect to the applied voltage as compared to the case where advance angle control is performed. Therefore, even if retard angle control is used during deceleration, there is no influence on the control.

On the other hand, in step S101, when the output duty does not exceed the overload determination reference value (step S101-NO), or when the motor rotational speed is not equal to or less than the threshold value (step S102-NO), the control part 54 shifts to the advance angle control mode. Accordingly, when the vehicle is not overloaded or decelerating, since control is performed in the advance angle control mode, a motor output as required can be obtained. By providing step S101 in addition to step S102, the conditions for shifting to the retard angle control mode are limited, and if the retard angle control mode is not required, it is possible to set to use the advance angle control mode which can improve the characteristics of the torque and the rotational speed of the motor. For example, although the motor decelerates near the reverse position of the wiper blade, the advance angle control mode is maintained if the duty does not exceed the overload determination reference value.

Figure 9A:
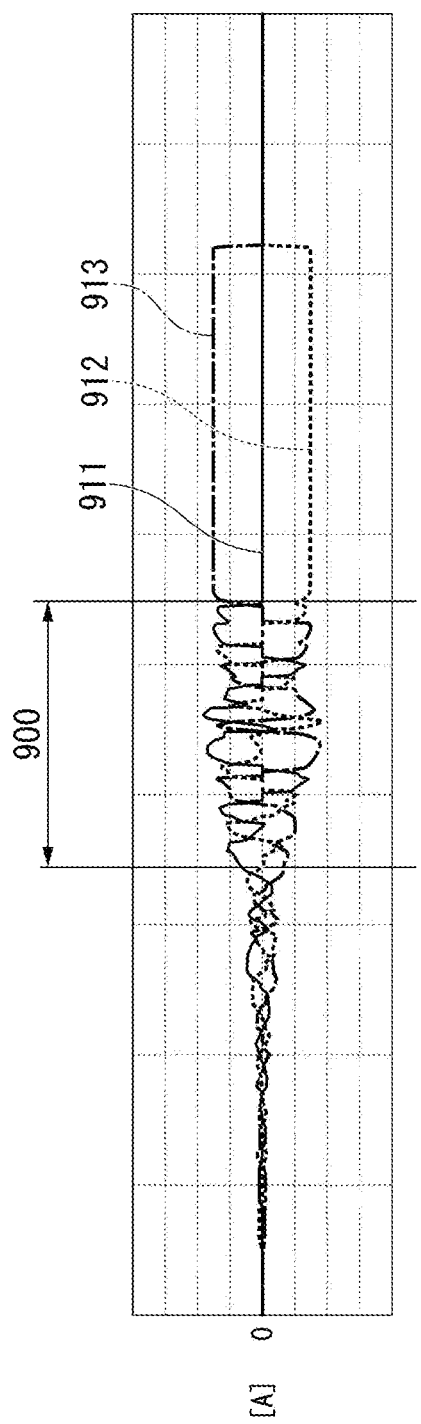
FIG. 9A is a diagram showing three-phase current waveforms when restrained after decelerating from steady driving in the advance angle control mode.

FIG. 9A is a diagram showing three-phase current waveforms when restrained after decelerating from steady driving in the advance angle control mode.

In FIG. 9A, the vertical axis represents the current value and the horizontal axis represents time.

When the motor is decelerated, as shown in a section 900, the currents of the U phase (reference sign 911), the V phase (reference sign 912), and the W phase (reference sign 913) all have waveforms in a broken state, which shows that the driving state of the motor is unstable.

Figure 9B:
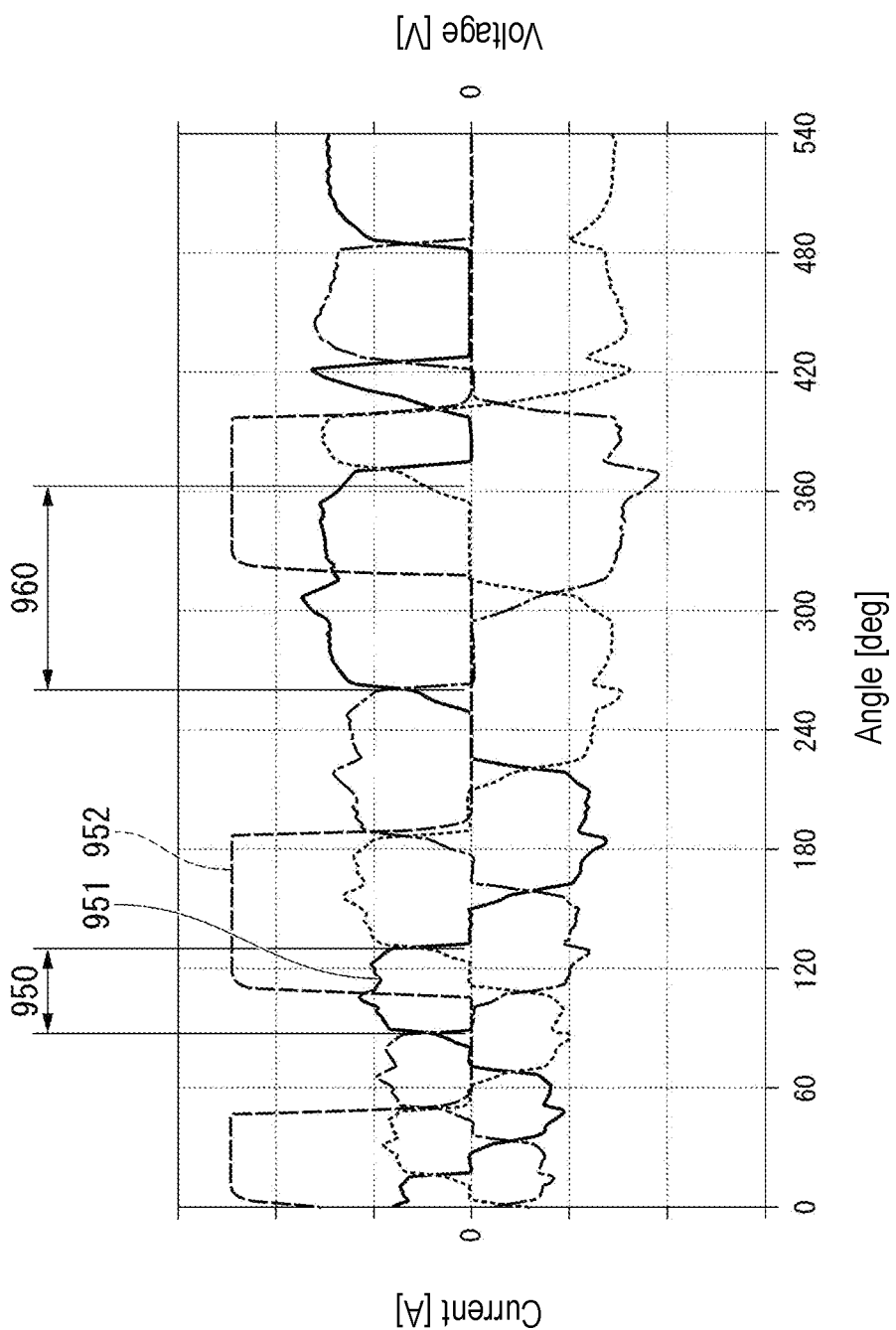
FIG. 9B is a diagram showing three-phase current waveforms when shifting to a deceleration state from steady driving in the advance angle control mode.

FIG. 9B is a diagram showing three-phase current waveforms and a position detection signal of the V-phase sensor when shifting to a deceleration state from steady driving in the advance angle control mode.

In FIG. 9B, the vertical axis represents the current value and the horizontal axis represents the electric angle.

In a section (reference sign 950), during steady driving, since the position detection signal (reference sign 952) of the V-phase sensor turns on at a timing which overlaps with the peak of the current value in the U phase (reference sign 951), the timings of the drive current applied to the U phase and the position detection signal detected by the rotation of the rotor according to the drive current are substantially in line with each other, and it can be said that the driving state is stable.

However, during deceleration, as shown in a section 960, since the position detection signal of the V-phase sensor turns on at a timing deviating from the peak of the current value in the U phase, there is a shift in timing between the drive current applied to the U phase and the position detection signal detected by the rotation of the rotor according to the drive current. Therefore, it can be said that the driving state is not stable.

Figure 10:
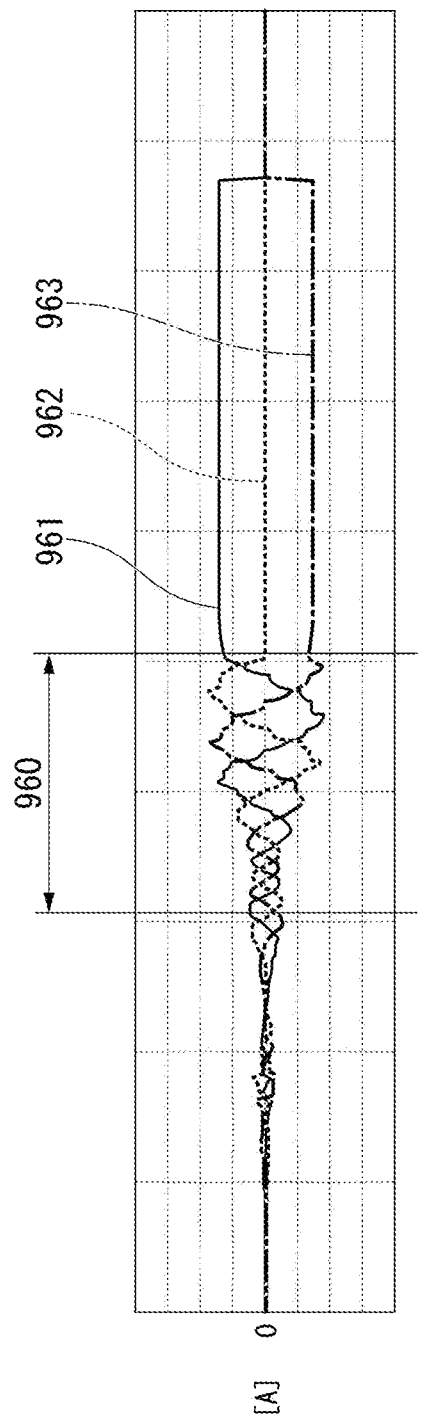
FIG. 10 is a diagram showing three-phase current waveforms when restraining the motor after decelerating from steady driving while using the function of switching from the advance angle control mode to the retard angle control mode.

Herein, FIG. 10 is a diagram showing three-phase current waveforms when restraining the motor after decelerating from steady driving while using the function of switching from the advance angle control mode to the retard angle control mode.

In FIG. 10, the vertical axis represents the current value and the horizontal axis represents time.

During motor deceleration, when energization is performed according to the retard angle control mode, as shown in a section 960, the currents of the U phase (reference sign 961), the V phase (reference sign 962), and the W phase (reference sign 963) are all in a relationship which may be said to be substantially similar in terms of the waveform, and since the waveforms are not disturbed, it indicates that the driving state of the motor is stable.

Figure 11:
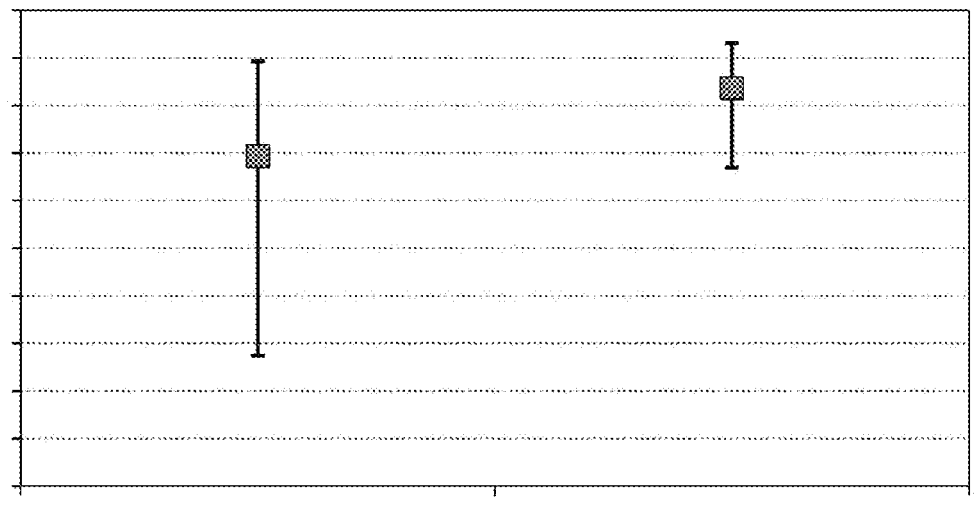
FIG. 11 is a diagram illustrating restraint torques when advance angle control is performed during deceleration and when retard angle control is performed during deceleration.

FIG. 11 is a diagram illustrating restraint torques when advance angle control is performed during deceleration and when retard angle control described above is performed during deceleration. The restraint torque is a value of the torque at the moment when the motor is locked.

The vertical axis represents the torque, and the horizontal axis shows whether the control is advance angle control or retard angle control. The vertical bar represents the range of the overall value, with the upper end of the vertical bar representing the maximum value, and the lower end of the vertical bar representing the minimum value. The point between the upper end and the lower end of the vertical bar represents the average value obtained for the overall value.

It is shown that, in advance angle control, the torque is not stable since the difference between the maximum value and the minimum value in the overall value is large. As the torque is not stable, the torque during motor lock may be low or high, and variation occurs in the restraint torque. Therefore, hunting is likely to occur.

On the other hand, it is shown that, in the case of performing the retard angle control described above, since the difference between the maximum value and the minimum value in the overall value is smaller than the difference between the maximum value and the minimum value of the overall value in advance angle control, the torque is more stable than in advance angle control. Accordingly, the hunting phenomenon is improved in retard angle control as compared to advance angle control. By improving the hunting phenomenon, since the motion of the motor can be stabilized during motor restraint, the restraint torque increases. Herein, since stabilized torque can be outputted even during motor lock, variation in the restraint torque is also suppressed. Further, since the motion of the motor is stable, the restraint torque can be kept within a high value range. In addition, as hunting can be suppressed, compared to the case of performing advance angle control, the position at which the motor is locked can be narrowed down to some extent, and variation in the lock position can be suppressed.

The function of the control part 54 according to the embodiment above may be realized by a computer. In that case, a program for realizing this function may be recorded on a computer-readable recording medium, and the function may be realized by having a computer system read the program recorded on the recording medium and executing the program. The "computer system" referred to herein includes an OS and hardware such as peripheral devices. Further, the "computer-readable recording medium" refers to a portable medium such as a flexible disk, a magneto-optical disk, a ROM, a CD-ROM, etc., or a storage device such as a hard disk built in a computer system. Furthermore, the "computer-readable recording medium" may also include a component which dynamically holds a program for a short period of time, such as a communication line when the program is transmitted via a network such as the Internet or a communication circuit such as a telephone circuit, and in that case, a component which holds the program for a certain period of time, such as a volatile memory inside a computer system serving as a server or a client. Further, the program above may also serve to realize a part of the function above, may further realize the function above in combination with programs already recorded in the computer system, and may be realized by using a programmable logic device such as an FPGA (field programmable gate array).

Although the embodiments of the present invention have been described in detail with reference to the drawings, the specific configuration is not limited to the embodiments but also includes designs and the like within a range that does not deviate from the gist of the present invention.

What is claimed is:

1. A motor control device which controls rotation of a rotor by energizing a coil having a plurality of phases in a brushless motor, the motor control device comprising:
    a plurality of sensors which detect a rotation position of the rotor and output a position detection signal;
    a rotational speed determination part which determines whether a rotational speed of the brushless motor is equal to or less than a predetermined threshold value based on the position detection signal; and
    a motor control part capable of selecting a first mode selected when the rotational speed of the brushless motor exceeds the threshold value, and selecting a second mode selected when the rotational speed of the brushless motor is equal to or less than the threshold value, wherein the motor control part has an energization control part which energizes the plurality of phases of the coil respectively at a predetermined energization timing set based on the position detection signal respectively of the plurality of sensors, when the energization control part energizes a first phase among the plurality of phases at a predetermined energization timing set based on the position detection signal of a first sensor among the plurality of sensors in the first mode, the energization control part energizes a second phase among the plurality of phases at a predetermined energization timing set based on the position detection signal of the first sensor in the second mode, and in the first mode, an energization timing to the second phase is advanced with respect to a timing at which the position detection signal of the first sensor turns on, and in the second mode, an energization timing to the second phase is retarded with respect to a timing at which the position detection signal of the first sensor turns on.

2. The motor control device according to claim 1, comprising a load determination part which determines whether a load applied to the brushless motor is a high load, wherein the motor control part switches from the first mode to the second mode when the brushless motor has a high load, the rotational speed of the brushless motor is equal to or less than the threshold value, and the brushless motor is driven in the first mode.

3. A motor unit comprising:

a brushless motor of any of a brushless wiper motor which swings a wiper arm, a brushless sunroof motor which opens and closes a roof panel, a brushless power window motor, and a brushless power seat motor; and the motor control device according to claim 1.

4. A motor control method in a motor control device which controls rotation of a rotor by energizing a coil having a plurality of phases in a brushless motor, the motor control method comprising:

detecting a rotation position of the rotor by a plurality of sensors to output a position detection signal;

determining whether a rotational speed of the brushless motor is equal to or less than a predetermined threshold value based on the position detection signal;

selecting a first mode when the rotational speed of the brushless motor exceeds the threshold value, and selecting a second mode when the rotational speed of the brushless motor is equal to or less than the threshold value;

energizing the plurality of phases of the coil respectively at a predetermined energization timing set based on the position detection signal respectively of the plurality of sensors;

when a first phase among the plurality of phases is energized at a predetermined energization timing set based on the position detection signal of a first sensor among the plurality of sensors in the first mode, a second phase among the plurality of phases is energized at a predetermined energization timing set based on the position detection signal of the first sensor in the second mode; and in the first mode, advancing an energization timing to the second phase with respect to a timing at which the position detection signal of the first sensor turns on, and in the second mode, retarding an energization timing to the second phase with respect to a timing at which the position detection signal of the first sensor turns on.

\* \* \* \* \*